United States Patent

[11] 3,600,522

[72] Inventor Gary R. Benson
Itasca, Ill.
[21] Appl. No. 872,584
[22] Filed Oct. 30, 1969
[45] Patented Aug. 17, 1971
[73] Assignee Bell Telephone Laboratories, Incorporated
Murry Hill, Berkely Heights, N.J.

[54] MODIFIED ABBREVIATED DIALING ARRANGEMENT
18 Claims, 4 Drawing Figs.

[52] U.S. Cl. .......... 179/18 BA, 179/18 D
[51] Int. Cl. .......... H04m 3/44, H04m 3/38
[50] Field of Search .......... 179/18 BA, 18 D

[56] References Cited
UNITED STATES PATENTS
2,951,908 9/1960 Malthaner et al. .......... 179/18 BA

*Primary Examiner*—William C. Cooper
*Attorneys*—R. J. Guenther and R. B. Ardis

ABSTRACT: In a telephone switching system employing abbreviated dialing, class of service information uniquely associated with abbreviated dialing directory numbers, is stored in an abbreviated dialing repertoire. The switching system is responsive to the dialing of abbreviated codes by originating subscribers to establish telephone calls to stations defined by the directory numbers stored in an abbreviated dialing repertoire, and to assign a class of service to the established calls as prescribed by the class of service information associated with the called directory number.

INVENTOR
G. R. BENSON
BY John C Albrecht
ATTORNEY

MODIFIED ABBREVIATED DIALING ARRANGEMENT

BACKGROUND OF THE INVENTION

This invention relates to a telecommunication system, and more particularly relates to a telephone switching system employing abbreviated dialing.

Known abbreviated dialing arrangements comprise memory for storing a repertoire of frequently called directory numbers wherein the directory numbers correspond to predetermined abbreviated codes. When a subscriber dials such an abbreviated code, the corresponding directory number is obtained from the repertoire and a telephone call is established using the obtained directory number. The treatment that a telephone system gives to a call is generally determined from class of service information uniquely associated with each originating subscriber station, independently of whether or not the call is established in response to the dialing of an abbreviated code. Such class of service information might include call charging information, path preference information, etc. Special call treatment which deviates from the treatment specified by the class of service information for the originating subscriber station may in certain instances be given to a call in response to the dialing of a special code by the originating subscriber. For example, in military systems preemption priority may be given to a call in response to a predetermined code dialed by the originating subscriber. Similarly, more than one communication network may be available to a subscriber, as for example, a private military communication network and the commercial telephone network. Access to other networks may generally be gained by the dialing of predetermined codes.

It is an object of this invention to provide special treatment for calls to predetermined stations without the dialing of additional codes by the subscriber.

It is a further object of this invention to provide a means for granting treatment to calls to predetermined stations which differs from the treatment normally given to calls originating from the calling station.

SUMMARY OF THE INVENTION

In accordance with this invention, originating class of service information which is uniquely associated with each of the directory numbers of an abbreviated dialing repertoire is stored in the repertoire. This class of service information is used by the system in addition to the originating class of service information customarily provided for each subscriber station. The information associated with a directory number of an abbreviated dialing repertoire may contain information generally not provided by the subscriber station originating class of service information. When a subscriber dials an abbreviated code, the corresponding directory number and its associated class of service information are retrieved from the repertoire. Connections for the desired call are then established by the system using the obtained directory number, the subscriber station originating class of service information, and the class of service information obtained from the repertoire. Any contradictions between the two types of class of service information are resolved in favor of the class of service information found in the repertoire. Consequently, the directory associated information supersedes the subscriber station class of service information.

DETAILED DESCRIPTION

Figure 1:
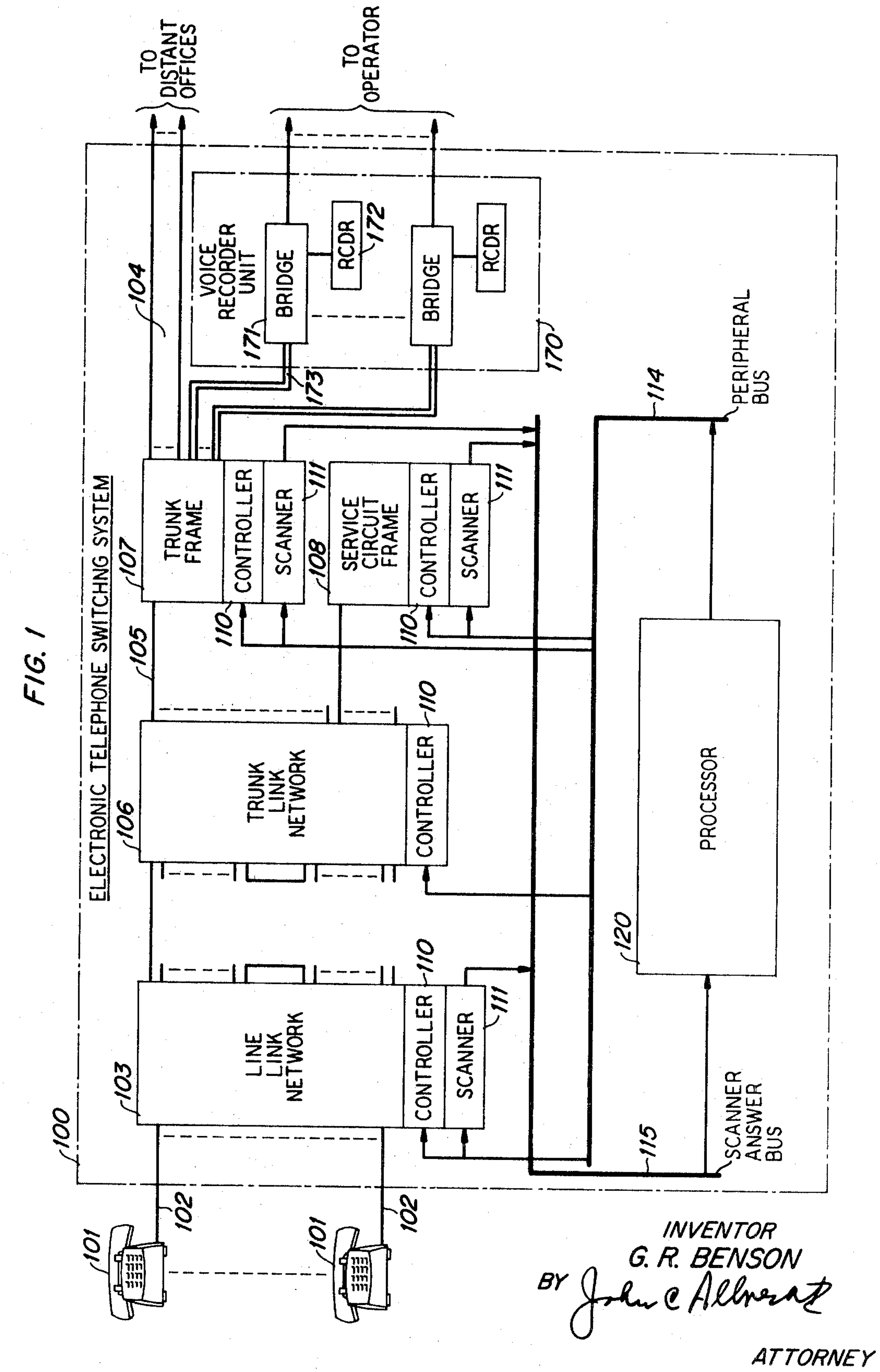
FIG. 1 shows the block diagram of a telephone switching system which comprises the illustrative embodiment of this invention.

The illustrative embodiment of this invention comprises an electronic telephone switching system as outlined in block diagram form in FIG. 1. *The Bell System Technical Journal*, Volume XLIII, No. 5, Sept. 1964 describes the operation of such an electronic switching system. As shown in FIG. 1, Subscriber Lines 102, which interconnect Subscriber Sets 101 with the Telephone Switching Office 100, are terminated on a Line Link Network 103. The Line Link Network 103 contains line termination circuits and several stages of interconnecting switches known in the prior art. Trunks 104, which connect to other telephone switching offices, are terminated on trunk circuits included in the Trunk Frame 107. A plurality of service circuits, such as various tone sources, are included in the Service Circuit Frame 108. The Trunk Link Network 106 comprises several stages of interconnecting switches and serves to interconnect the Trunk Frame 107 and the Service Circuit Frame 108 with the Line Link Network 103. The Line Link Network 103, the Trunk Link Network 106, the Trunk Frame 107, and the Service Circuit Frame 108 are each controlled by Controllers 110 which in turn receive control signals from the system's Processor 120 via the Peripheral Bus 114. Scanners 111 are provided for the Line Link Network 103, the Trunk Frame 107, and the Service Circuit Frame 108. Like the Controllers 110, the Scanners 111 are also controlled by the Processor 120 via the Peripheral Bus 114. It is the function of the Scanners 111 to detect the supervisory states of the networks and trunk and service circuits and to transmit signals representing these states to the Processor 120 via the Scanner Answer Bus 115.

Figure 2:
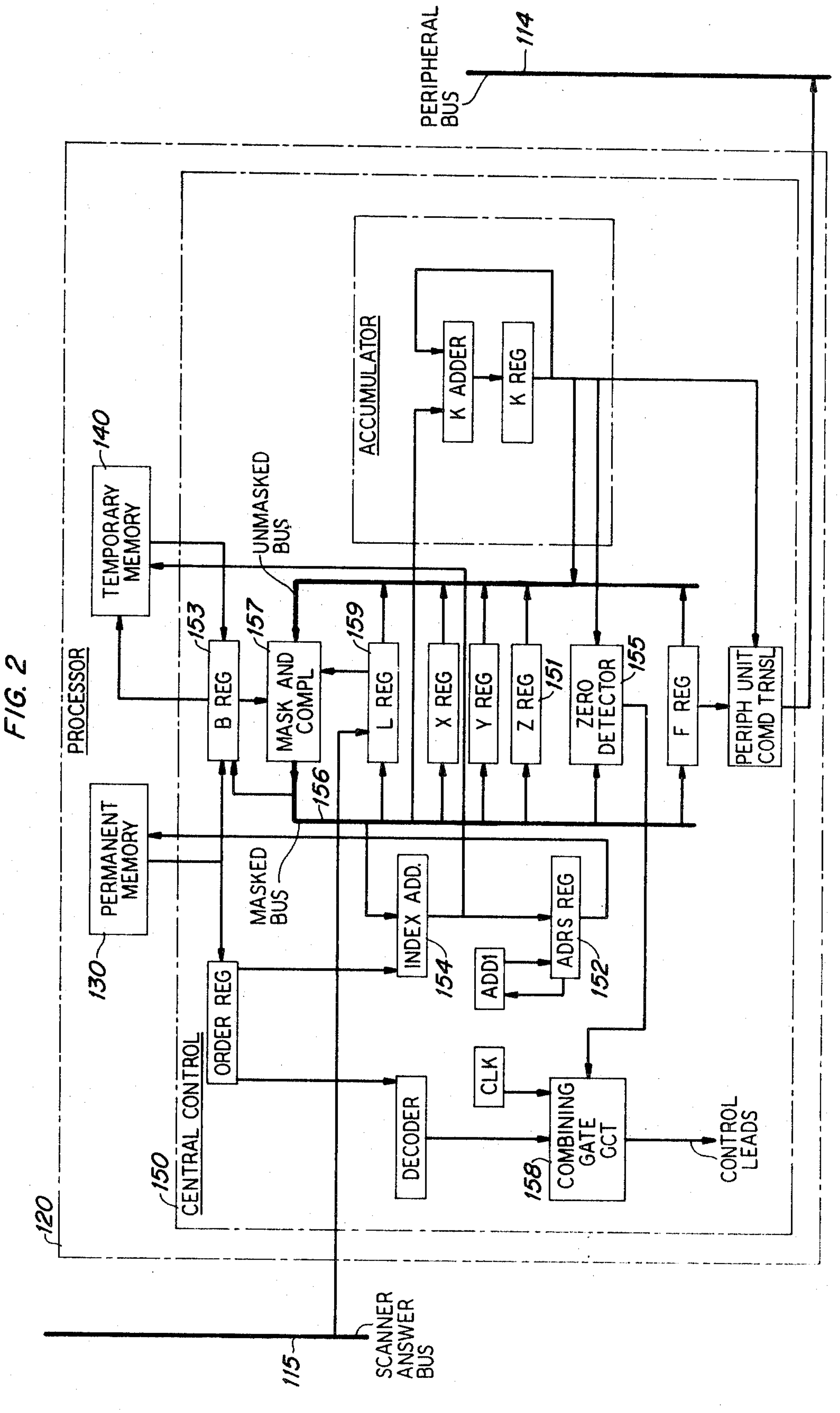
FIG. 2 shows the main divisions of the processor of the system of FIG. 1.

The Processor 120 is a program controlled data handling machine shown in somewhat more detail in FIG. 2. It comprises three main subsystems, they are: the Central Control 150, the Permanent Memory 130, and the Temporary Memory 140. The Central Control 150 primarily controls the operation of the telephone switching system by means of control signals transmitted to the Controllers 110 over the Peripheral Bus 114. The Permanent Memory 130 is a read-only memory which contains programs defining the system's course of action required for the performance of the total telephone switching function. The Central Control 150 selectively reads the instruction words which comprise the programs from the Permanent Memory 130, and generates control pulses for the Controllers 110 in accordance with these instructions and data obtained from the Temporary Memory 130. Furthermore, the Central Control 150 records and acts upon supervisory state information received from the Scanners 111.

The programs for controlling the switching system comprise several special purpose programs dedicated to specified functions. Input and output programs are examples. Input programs cause the Central Control 150 to obtain from the Scanners 111 information regarding the supervisory states of lines and trunks and to compare the present supervisory states with previously detected supervisory states in order to determine changes in the supervisory states. Output programs control the activation and operation of the Controllers 110 to cause desired connections to be established throughout the system. Other programs are dedicated to the establishment of a telephone call; they include:

1. a dialing connection program used to set up a dialing connection to an originating station;
2. a digit analysis program used to record and analyze digits received from a line or trunk, and to determine the destination of a call;
3. a ringing and answer detecting program used to establish a ringing connection, detect the called subscriber's answer, and establish a talking connection; and
4. a call disconnect program used to control the disconnect of a call.

Furthermore, there are various translation programs employed to make translations as, for example, from line equipment number to directory number, and vice versa.

The Memories 130 and 140 each have areas which are dedicated to specified purposes. One such area in the Temporary Memory 140 comprises a group of locations referred to as originating registers, which are used to store information essential to the establishment of calls through the system. The Permanent Memory 130 has designated areas which are employed to store such information as class of service information for each line, translation information, etc. The Permanent Memory 130 also contains lists of directory numbers which are used in connection with abbreviated dialing.

Figure 4:
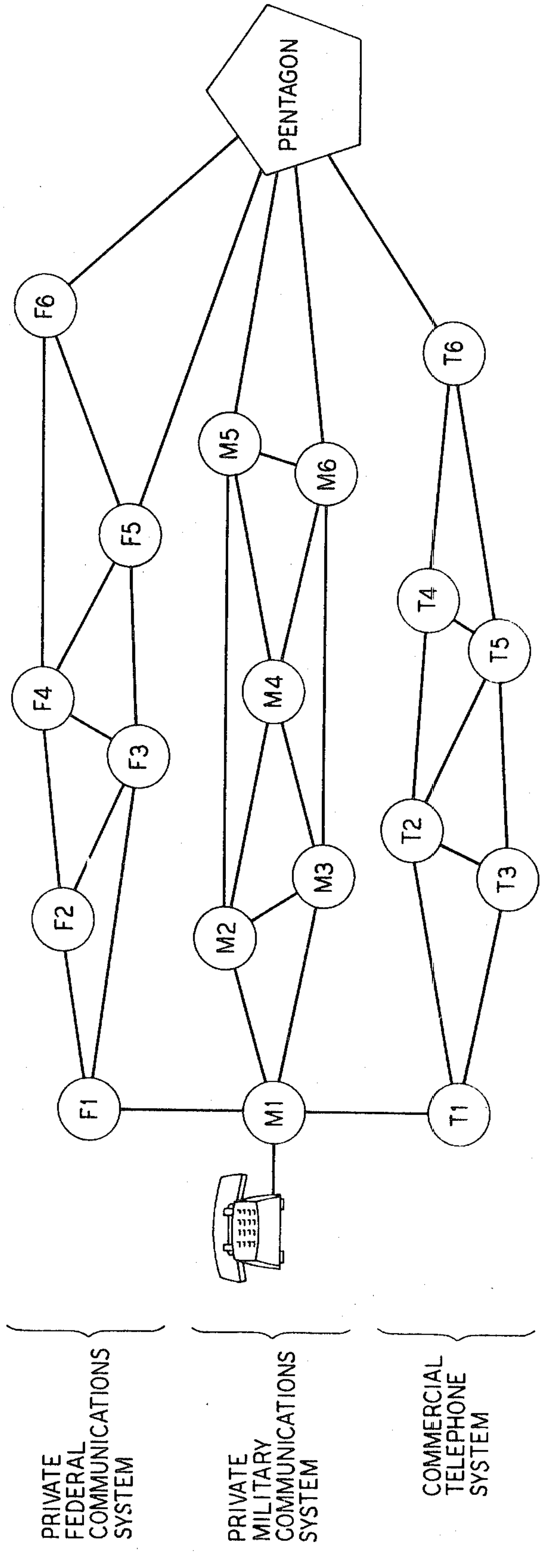
FIG. 4 is a pictorial representation of three independent communication systems interconnecting two points of interest.

The illustrative embodiment of my invention comprises a telephone switching system which is part of a private military communication system. As is customary in military systems, the illustrative system has the facility for preempting existing calls in order to establish calls having higher preemption priority. Furthermore, the system has the facility to provide interconnecting paths of at least two different grades within the military system, namely, voice grade and special grade; and it has the facility to extend calls from the military communication system to the commercial telephone system and a private federal communication system. FIG. 4 depicts three independent communication networks interconnecting two points of interest, for example, the military installation M1 and the Pentagon. A communication path between these points can be established using the military communication system, the federal communication system or the commercial telephone system. If the military system is to be used, connections are made from the switching office M1 to switching office M2 or M3 and from there through to the Pentagon; if the federal communication system is to be used, connections are made from the switching office M1 to the switching office F1 and from there to the Pentagon via the federal communication system; and if the commercial telephone system is to be used, connections are made from the switching office M1 to the switching office T1 and from there to the Pentagon via the commercial telephone system.

A special feature of the illustrative system is the recording of a telephone conversation upon request by the originating party to the conversation. A Voice Recorder Unit 170 is connected to the Trunk Frame 107 by means of a plurality of trunks. The Voice Recorder Unit 170 comprises several recorders, and a corresponding number of bridge circuits each of which is connected to two trunks. An originating subscriber requests a voice recorder by dialing the voice recorder service code to which the system responds by connecting the originating party to an available voice recorder. For example, if Recorder 172 is available, the originating subscriber will be connected to the associated Bridge Circuit 171 via one of the pair of Voice Recorder Trunks 173 connected to Bridge Circuit 171. After this connection has been established, an announcement machine within Recorder 172 announces to the subscriber recorder identification and the message number to be assigned to the recorded call. After having received the above information from the recorder, the subscriber proceeds to dial a directory number. The switching system then completes the call by ringing the called subscriber and establishing a talking path from the called party to the other of the pair of Voice Recorder Trunks 173 when the called party answers. In this manner, a talking path is established via the Bridge Circuit 171 to which the Recorder 172 is connected.

A subscriber connected to the illustrative system may dial three distinct pieces of information in the origination of a call, namely: a precedence code specifying the priority level to be assigned to the call; a service code specifying the limitary system voice or special grade, the commercial telephone system, the federal communication system, or the connection of a voice recorder; and a 7-digit or 10-digit directory number identifying the called station. In this illustrative system the originating class of service information, which is uniquely assigned to each subscriber station and is stored in the Permanent Memory 130, contains a precedence code defining the call preemption priority level to be assigned to calls originating from the station and grade of service information specifying either voice or special grade. Thus, in absence of any special codes dialed by the subscriber, the treatment given to the originating call is defined by the station class of service information. Other military switching systems use the lowest available priority and grade of service if the customer does not dial any special codes.

In accordance with my invention, an abbreviated dialing arrangement is provided whereby a subscriber may originate a call having a predetermined preemption priority and grade of service by dialing only an abbreviated dialing code. This is accomplished by storing a precedence code and a service code (which includes the voice recorder service code) with each directory number of the abbreviated dialing repertoire. However, if the originating subscriber dials a precedence or service code in addition to the abbreviated dialing code, the dialed information supersedes the information stored in the abbreviated dialing list and the call is completed using the dialed information.

Figure 3:
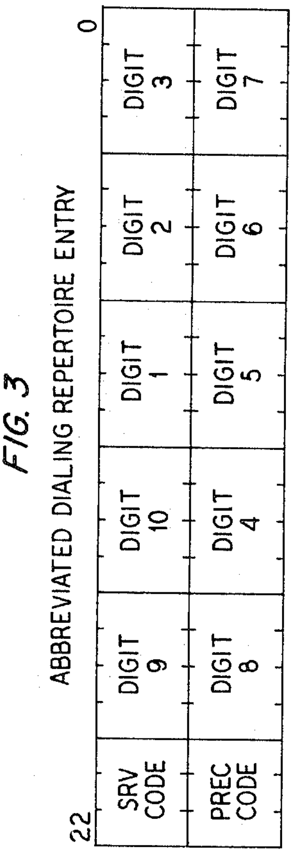
FIG. 3 shows a suggested arrangement of data in the abbreviated dialing repertoire of the illustrative embodiment.

A suggested layout of an entry in the abbreviated dialing list is shown in FIG. 3. Each entry comprises space for a 10-digit directory number, a precedence code, and a service code. The service code comprises three binary bits and the meaning assigned to each of the eight combinations which can be derived therefrom is as follows:

| Code | Meaning |
|---|---|
| 000 | No service code. |
| 001 | Military communication system voice grade service. |
| 010 | Military communication system special grade service. |
| 011 | Commercial telephone system. |
| 100 | Federal communication system. |
| 101 | Attachment of the voice recorder. |
| 110, 111 | Not used |

Similarly, the precedence code stored with each directory number also comprises three bits. The meaning of the various combinations of these bits in this illustrative system is as follows:

| Code | Meaning |
|---|---|
| 000 | No precedence code is specified. |
| 001 | Priority level 0 |
| 010 | Priority level 1 |
| 011 | Priority level 2 |
| 100 | Priority level 3 |
| 101 | Priority level 4 |
| 110, 111 | Not used |

Priority level 4 is the lowest or routine level and priority level 0 is the highest level in the priority hierarchy.

As mentioned earlier, input programs detect when a subscriber station goes off-hook and the dialing connection program establishes a dialing connection for the off-hook subscriber station. This connection is made from the subscriber's line to a call signaling receiver in the Service Circuit Frame 108 via the Line Link Network 103, Junctors 105, and the Trunk Link Network 106. The call signaling receiver detects signals transmitted by subscriber telephone sets, such as TOUCH-TONE sets. The dialing connection program also seizes one of a plurality of originating registers which have been provided in the Temporary Memory 140 to be used for the storing of information essential to the establishment of a call.

Subsequently, the digit analysis program is employed to store the digits which are received from the originating station by the call signaling receiver in the seized originating register. The digit analysis program selectively examines the received digits to determine whether a special code has been dialed by the subscriber (e.g., an abbreviated dialing code). When the digit analysis program recognizes the precedence code, it inserts this code into the originating register. Similarly, when a service code (e.g., the code requesting the commercial telephone network) is dialed by the subscriber, the appropriate entries are made in the originating register in a space reserved for that purpose. When the code which specifies the voice recorder is received, a special voice recorder bit in the originating register is set. The dialed precedence and service codes each are stored in the originating register in the form of a 3-bit binary code of which not all bits are "0."

In this illustrative system, the third digit of an abbreviated dialing code is the "A" digit. When the digit analysis program encounters the "A" digit, it checks to see if the originating party is allows abbreviated dialing, and whether the first and second digits accompanying the "A" digit are valid. If the originating party is not allowed abbreviated dialing or the digits are not valid, a reorder tone is given to the originating subscriber. If all is valid, the received abbreviated dialing code is passed to a translation subroutine. This is accomplished by placing the abbreviated code in a predetermined register of the Central Control 150, for example, the "Z" register 151. The transfer is then made to the desired translation program by the insertion of a transfer address in the Address Register 152. Subsequently, the translation program, which is stored in the Permanent Memory 130, is executed and the code in the "Z" register 151 is added to a table number supplied by the program. This latter operation is accomplished by means of the Index Adder 154. The result is an address which points to a selected entry in an abbreviated dialing list in the Permanent Memory 130. The translation program then obtains the contents of the selected entry, which comprises a directory number, a precedence code, and a service code, and stores them in a predetermined area of the Temporary Memory 140. Thereafter a transfer is made back to the digit analysis program. This latter program performs a "0" check on the precedence code area of the originating register to determine whether a precedence code is present therein, as indicated by the presence of a binary code other than all "0's." The presence of a precedence code in the originating register indicates that the subscriber dialed a precedence code prior to dialing the abbreviated code, and that the code obtained from the abbreviated dialing repertoire is to be ignored. In the absence of a dialed precedence code in the originating register, the code obtained from the repertoire is stored therein. The "0" check is performed by reading the word containing the code to be checked from memory into the "B" register 153 and gating the word onto the Masked Bus 156 via the Mask and Complement Circuit 157. A preloaded control word in the "L" register 159 causes all but the desired code to be masked out of the word. The Zero Detector 155 is designed to test whether a word being gated on the Masked Bus 156 contains all "0's." The output of the Zero Detector 155 is used in the Combining Gate Circuit 158 in the generation of control signals which control whether or not the processor will write the new information in the originating register in memory.

Like the precedence code, the service code obtained from the repertoire is inserted into the originating register only if no service code was dialed by the originating subscriber. However, the service code which specifies a voice recorder is an exception. When that code is detected, the voice recorder bit is set in the originating register without regard to any other service code (e.g., a code requesting the commercial telephone network) which might be stored therein. After the directory number obtained from the repertoire has been stored in the originating register and the associated codes in the originating register have been properly adjusted, the class of service information of the originating station is read from the Permanent Memory 130. A "0" check is again made on the precedence and service codes of the originating register, and the precedence and service codes defined by the station class of service information are inserted into the originating register only if no entry has been previously made in the spaces reserved for these codes.

Described above is a 3-level hierarchical system. Information dialed by the subscriber is assigned the highest level, originating class of service information stored in the abbreviated dialing repertoire is assigned the second level, and originating class of service information uniquely assigned to the originating station is assigned the lowest level. This 3-level scheme is implemented by first inserting dialed information into the originating register, then inserting information obtained from the repertoire only if no dialed information has been received and, lastly, inserting originating station class of service information only if the corresponding information was not dialed by the subscriber or stored in the abbreviated dialing repertoire. The information in the originating register is subsequently used in the establishment of the desired connections for a call. For example, a subscriber might have a precedence code specifying the preemption priority level "4" in his assigned subscriber station class of service information, and a precedence code specifying preemption priority level "2" in the abbreviated dialing repertoire. If this subscriber should dial a precedence code specifying priority level "1" in addition to the abbreviated dialing code, the resulting call would be completed using preemption priority level "1." If that same subscriber should dial the abbreviated code without dialing a precedence code, the call would be completed using preemption priority level "2." If he should dial a directory number instead of an abbreviated code, and should dial no precedence code, the resulting call would be completed using priority level "4."

As mentioned earlier, some military systems use the lowest available priority and grade of service if the customer does not dial any special code. Since in such systems no transfer is made of precedence and service codes from the station class of service information to the originating register, the system simply completes the call using the lowest available level if no precedence or service code is specified in the originating register.

Upon completion of the preloading of the originating register by the digit analysis program, the ringing and answer detection program is called in to complete the establishment of the call using the information stored in the originating register. This latter program checks the voice recorder bit of the originating register and, if this bit is set, the calling subscriber is connected to one port of an available voice recorder in the Voice Recorder Unit 170 as previously explained. In case of a local call, the ringing and answer detection program establishes a ringing connection from a ringing tone generator in the Service Circuit Frame 108 to the substation defined by the directory number in the originating register and, upon answer by the called party, establishes the talking path. In case the call extends to a distant office, the ringing and answer detection program transmits the necessary digits to the distant office, and establishes the desired talking path through the network upon receipt of an indication from the distant office that the called party has answered. The service code in the originating register which specifies the interconnection network to be used (e.g., military voice grade) is consulted by this program in establishing the necessary connections. Precedence information in the originating register is also used to determine whether any existing conversation must be preempted if the called station is busy or if there are no trunks available to the switching office to which the called station is connected.

The talking path established by the ringing and answer detection program will be maintained until one of the two parties goes on-hook. At that time the call disconnect program is called in and the talking path connections are removed under control of the call disconnect program.

It is to be understood that the above-described arrangement is merely illustrative of the application of the principles of the invention; numerous other arrangements may be devised by those skilled in the art without departing from the spirit and scope of the invention.

What I claim is:

1. In a telephone switching system arranged for abbreviated dialing, the combination comprising:
a switching network;
a plurality of subscriber stations connected to said network;
memory means for storing abbreviated dialing lists, said lists comprising predetermined directory numbers and originating class of service information uniquely associated with each of said directory numbers; and
means responsive to signals representing abbreviated dialing codes transmitted by said subscriber stations for establishing connections through said network in accordance with said directory numbers and said associated originating class of service information.

2. A telephone switching system comprising:
a switching network;
a plurality of subscriber stations connected to said network by means of subscriber lines;
scanning means for detecting signals transmitted by said stations on said lines;
memory means for storing an abbreviated dialing repertoire comprising a plurality of entries,
each of said entries corresponding to a predetermined abbreviated dialing code and each containing a directory number and class of service information uniquely associated with said directory number; and
control means for analyzing signals detected by said scanning means and operative upon receipt of an abbreviated dialing code from an originating one of said lines to obtain the directory number and class of service information from the entry corresponding to said received code and to control said network to effect telephone connections between said originating line and the subscriber station defined by said directory number in accordance with said associated class of service information.

3. In a communication switching system,
a plurality of subscriber stations,
memory means for storing a list of destination station identification numbers and for storing originating class of service information uniquely associated with said station identification numbers, and
means responsive to coded signals transmitted by an originating subscriber station to selectively establish communication paths between said originating station and stations defined by said identification numbers in accordance with said associated originating class of service information.

4. A telephone switching system comprising:
a plurality of subscriber stations;
memory means for storing originating station class of service information uniquely assigned to each subscriber station, and for storing abbreviated dialing lists containing directory numbers and originating class of service information uniquely associated with each of said directory numbers of said lists; and
means responsive to calling signals transmitted by an originating subscriber station to establish communication paths between said originating station and destination stations defined by directory numbers transmitted by said originating subscriber station and between said originating station and destination stations defined by directory numbers stored in said lists,
said communication paths being established in accordance with said originating station class of service information when the destination station is defined by a directory number transmitted by said originating station, and being established in accordance with said associated class of service information when the destination station is defined by a directory number stored in said list.

5. A telephone switching system comprising:
a plurality of subscriber stations;
memory means for storing abbreviated dialing lists containing directory numbers and originating class of service information uniquely associated with each of said directory numbers; and
means responsive to calling signals representing abbreviated dialing codes transmitted by an originating subscriber station to selectively establish communication paths between said originating station and destination stations defined by said directory numbers,
said communication paths being established in accordance with predetermined coded signals representing class of service information transmitted by said originating station in addition to said signals representing said abbreviated dialing codes and established in the absence of said predetermined coded signals in accordance with said associated originating class of service information.

6. A communication switching system comprising:
a switching network;
a plurality of subscriber stations connected to said network;
a recording means for recording communications;
memory means for storing an abbreviated dialing repertoire containing a plurality of directory numbers and coded information uniquely associated with each of said directory numbers; and
means responsive to abbreviated dialing codes transmitted by an originating subscriber station to control said network to selectively establish communication paths between said originating station and stations defined by said stored directory numbers and responsive to said coded information associated with said stored directory numbers to control said network to effect a connection between said recording means and said communication paths.

7. A telephone switching system comprising:
a plurality of subscriber stations;
memory means for storing originating station preemption priority information uniquely assigned to each subscriber station, and for storing an abbreviated dialing list containing directory numbers and preemption priority information uniquely associated with each of said directory numbers; and
means responsive to calling signals transmitted by an originating subscriber station to establish communication paths between said originating station and destination stations defined by directory numbers transmitted by said originating subscriber station and between said originating station and destination stations defined by directory numbers stored in said list, and to assign a preemption priority level to the establishing of said communication paths,
said preemption priority level being defined by said originating station preemption priority information when the destination station is defined by a directory number transmitted by said originating station, and said preemption priority level being defined by said associated preemption priority information when the destination station is defined by a directory number stored in said list.

8. A telephone switching system comprising:
a plurality of subscriber stations;
memory means for storing an abbreviated dialing list containing directory numbers and preemption priority information uniquely associated with each of said directory numbers; and
means responsive to signals representing abbreviated dialing codes transmitted by an originating subscriber station to selectively establish communication paths between said originating station and stations defined by said directory numbers and to assign a preemption priority level to said communication paths, said preemption priority level being defined by priority code signals transmitted by said originating station in addition to said signals representing abbreviated dialing codes and defined in the absence of said transmitted priority code signals by said associated preemption priority information.

9. A telephone switching system comprising:
a plurality of subscriber stations each having a predetermined grade of service;
a switching network for interconnecting said subscriber stations;
memory means for storing an abbreviated dialing list containing directory numbers and grade of service information uniquely associated with each of said directory numbers; and
control means responsive to coded calling signals transmitted by an originating subscriber to control said network to effect interconnections between said originating subscriber station and destination stations defined by directory numbers transmitted by said originating station and between said originating station and destination stations defined by directory numbers stored in said list, and for assigning a grade of service to said interconnections,
said assigned grade of service being defined by said predetermined grade of service when the destination station is defined by a directory number transmitted by said originating station and said assigned grade of service being defined by said associated grade of service information when the destination station is defined by directory numbers stored in said list.

10. A telephone switching system comprising:
a plurality of subscriber stations;
a switching network for interconnecting said subscriber stations;
memory means for storing abbreviated dialing lists containing directory numbers and grade of service information uniquely associated with each of said directory numbers; and
control means responsive to coded calling signals transmitted by an originating subscriber station to control said network to effect interconnections between said originating station and stations defined by said directory numbers stored in said lists and for assigning a grade of service to said interconnections,
said assigned grade of service being defined by information transmitted by said originating subscriber station and defined in the absence of such transmitted grade of service information by said grade of service information associated with said directory numbers and stored in said memory.

11. In a communication system comprising:
a plurality of independent communication networks; and
a telephone switching office comprising:
a plurality of subscriber stations,
memory means for storing an abbreviated dialing list containing directory numbers defining destination station and grade of service information uniquely associated with each of said directory numbers, said grade of service information defining a selected one of said communication networks, and
means responsive to signals representing abbreviated dialing codes transmitted by an originating subscriber station to initiate the establishment of a communication path between said originating station and a destination station defined by a selected one of said directory numbers via the communications network defined by said network identification information associated with said selected directory number.

12. A communication switching system comprising:
a switching network;
a plurality of subscriber stations connected to said network;
memory means for storing originating class of service words uniquely associated with said subscriber stations, for storing abbreviated dialing lists each containing a plurality of directory numbers, and for storing originating class of service information uniquely associated with each of said directory numbers; and
control means responsive to calling signals representing directory numbers transmitted by originating stations to control said network to establish communication paths between said originating station and stations defined by said transmitted directory numbers in accordance with information stored in said originating class of service words, and responsive to signals representing abbreviated dialing codes transmitted by originating stations to establish communication paths between said code transmitting originating stations and stations defined by directory numbers stored in said abbreviated dialing lists in accordance with class of service information uniquely associated with each of said directory numbers.

13. A telephone switching system in accordance with claim 12 wherein said class of service information comprises preemption priority information and wherein said control means is adapted to control said network to preempt existing telephone connections in order to establish calls having a higher preemption priority.

14. A telephone switching system in accordance with claim 12 wherein said class of service information includes grade of service information defining characteristics of said communication path.

15. A communication switching system comprising:
a switching network;
a plurality of subscriber stations connected to said network;
memory means for storing originating class of service words uniquely associated with each of said subscriber stations, for storing an abbreviated dialing list containing a plurality of directory numbers each corresponding to a predetermined abbreviated dialing code, and for storing originating class of service information uniquely associated with each of said directory numbers; and
control means responsive to signals representing class of service information and an abbreviated dialing code transmitted by an originating subscriber station to control said network to establish a communication path between said originating station and the station defined by the directory number corresponding to said transmitted abbreviated dialing code in accordance with said transmitted class of service information, and in the absence of transmitted class of service information to establish said communication path in accordance with the class of service information associated with the directory number corresponding to said transmitted abbreviated dialing code and, in the absence of both said transmitted class of service information and said directory number associated class of service information, to establish said communication path in accordance with information stored in the class of service word uniquely associated with said originating subscriber station.

16. A communication switching system in accordance with claim 15 wherein said class of service information comprises preemption priority information and said control means is adapted to control said network to preempt existing telephone connections and to establish calls having a higher preemption priority.

17. A telephone switching system in accordance with claim 15 wherein said class of service information includes grade of service information defining transmission characteristics of said communication path.

18. A telephone switching system arranged for abbreviated dialing comprising:
a memory for storing an abbreviated dialing list comprising a plurality of entries, each of said entries corresponding to a predetermined abbreviated dialing code and each containing a directory number; and
means operative upon receipt of an abbreviated dialing code from an originating subscriber station to establish a communication path between said originating station and the called subscriber station defined by the directory number stored in the entry of said list corresponding to said received abbreviated dialing code;

wherein each of said entries further contains originating class of service information uniquely associated with said directory numbers, and said system further comprises means for resolving conflicts between originating class of service information unique to said originating station and the originating class of service information associated with the directory number defining said called subscriber station.